United States Patent
Todd (10) Patent No.: US 11,334,557 B2
(45) Date of Patent: May 17, 2022

(54) METHOD AND SYSTEM FOR DERIVING METADATA CHARACTERISTICS OF DERIVATIVE ASSETS

(71) Applicant: EMC IP Holding Company LLC, Hopkinton, MA (US)

(72) Inventor: Stephen James Todd, North Conway, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 363 days.

(21) Appl. No.: 16/523,683

(22) Filed: Jul. 26, 2019

(65) Prior Publication Data

US 2021/0026832 A1 Jan. 28, 2021

(51) Int. Cl.
G06F 16/23 (2019.01)
(52) U.S. Cl.
CPC .............................. G06F 16/2365 (2019.01)
(58) Field of Classification Search
CPC .................................................. G06F 16/2365
USPC ........................................................ 707/691
See application file for complete search history.

(56) References Cited

U.S. PATENT DOCUMENTS

| | | | | |
|---|---|---|---|---|
| 7,529,780 B1 * | 5/2009 | Braginsky | ............... | H04L 67/42 |
| 7,725,454 B2 * | 5/2010 | Kamani | .................. | G06F 16/33 |
| | | | | 707/711 |
| 2010/0094803 A1 * | 4/2010 | Yamakawa | ........... | G06F 16/907 |
| | | | | 707/609 |
| 2010/0115346 A1 * | 5/2010 | Lee | ......................... | H04L 67/32 |
| | | | | 714/49 |
| 2013/0179481 A1 * | 7/2013 | Halevy | ................. | G06F 16/134 |
| | | | | 707/827 |
| 2014/0280230 A1 * | 9/2014 | Masato | ................. | G06F 16/487 |
| | | | | 707/749 |
| 2017/0078234 A1 * | 3/2017 | Massand | ............... | H04L 51/063 |
| 2017/0220403 A1 * | 8/2017 | Maag | .................. | G06F 11/0775 |
| 2018/0196871 A1 * | 7/2018 | Butler | .................. | G06F 40/205 |
| 2019/0095817 A1 * | 3/2019 | Ma | ......................... | G06F 16/951 |
| 2020/0133945 A1 * | 4/2020 | Friedt | ................. | G06F 16/2425 |

* cited by examiner

*Primary Examiner* — James Trujillo
*Assistant Examiner* — Fariborz Khoshnoodi
(74) *Attorney, Agent, or Firm* — Chamberlain, Hrdlicka, White, Williams & Aughtry (57) ABSTRACT

In general, the invention relates to a method for managing data. The method includes obtaining, by a data management system, a derived data request from a client, and in response to the derived data request: obtaining a plurality of data sets based on the derived data request, identifying a plurality of metadata, wherein each metadata of the plurality of metadata is associated with a data set of the plurality of data sets, performing a metadata analysis on the plurality of metadata, making a determination, based on the metadata analysis, that derived data may be generated, performing a derived metadata operation on the plurality of metadata to obtain derived data, performing a derived data operation on the data sets to obtain derived data, associating the derived metadata with the derived data, and providing the derived metadata and the derived data to the client.

17 Claims, 7 Drawing Sheets

METHOD AND SYSTEM FOR DERIVING METADATA CHARACTERISTICS OF DERIVATIVE ASSETS

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage.

SUMMARY

In general, the invention relates to a method for managing data. The method includes obtaining, by a data management system, a derived data request from a client, and in response to the derived data request: obtaining a plurality of data sets based on the derived data request, identifying a plurality of metadata, wherein each metadata of the plurality of metadata is associated with a data set of the plurality of data sets, performing a metadata analysis on the plurality of metadata, making a determination, based on the metadata analysis, that derived data may be generated, performing a derived metadata operation on the plurality of metadata to obtain derived data, performing a derived data operation on the data sets to obtain derived data, associating the derived metadata with the derived data, and providing the derived metadata and the derived data to the client.

In general, the invention relates to a non-transitory computer readable medium which includes computer readable program code, which when executed by a computer processor enables the computer processor to perform a method for managing data. The method includes obtaining, by a data management system, a derived data request from a client, and in response to the derived data request: obtaining a plurality of data sets based on the derived data request, identifying a plurality of metadata, wherein each metadata of the plurality of metadata is associated with a data set of the plurality of data sets, performing a metadata analysis on the plurality of metadata, making a determination, based on the metadata analysis, that derived data may be generated, performing a derived metadata operation on the plurality of metadata to obtain derived data, performing a derived data operation on the data sets to obtain derived data, associating the derived metadata with the derived data, and providing the derived metadata and the derived data to the client.

In general, the invention relates to a system that includes a processor and memory that includes instructions, which when executed by the processor perform a method for managing data. The method includes obtaining, by a data management system, a derived data request from a client, and in response to the derived data request: obtaining a plurality of data sets based on the derived data request, identifying a plurality of metadata, wherein each metadata of the plurality of metadata is associated with a data set of the plurality of data sets, performing a metadata analysis on the plurality of metadata, making a determination, based on the metadata analysis, that derived data may be generated, performing a derived metadata operation on the plurality of metadata to obtain derived data, performing a derived data operation on the data sets to obtain derived data, associating the derived metadata with the derived data, and providing the derived metadata and the derived data to the client.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing data. More specifically, embodiments of the invention relate to a method for obtaining data sets from multiple local data systems and deriving data based on the derived data. Further, embodiments of the invention relate to a method for deriving metadata based on metadata associated with each obtained data set. Embodiments of the invention may include applying a rules engine to combine the obtained metadata to generate the derived metadata. Embodiments of the invention may further include associating the derived metadata with the derived data.

Figure 1A:
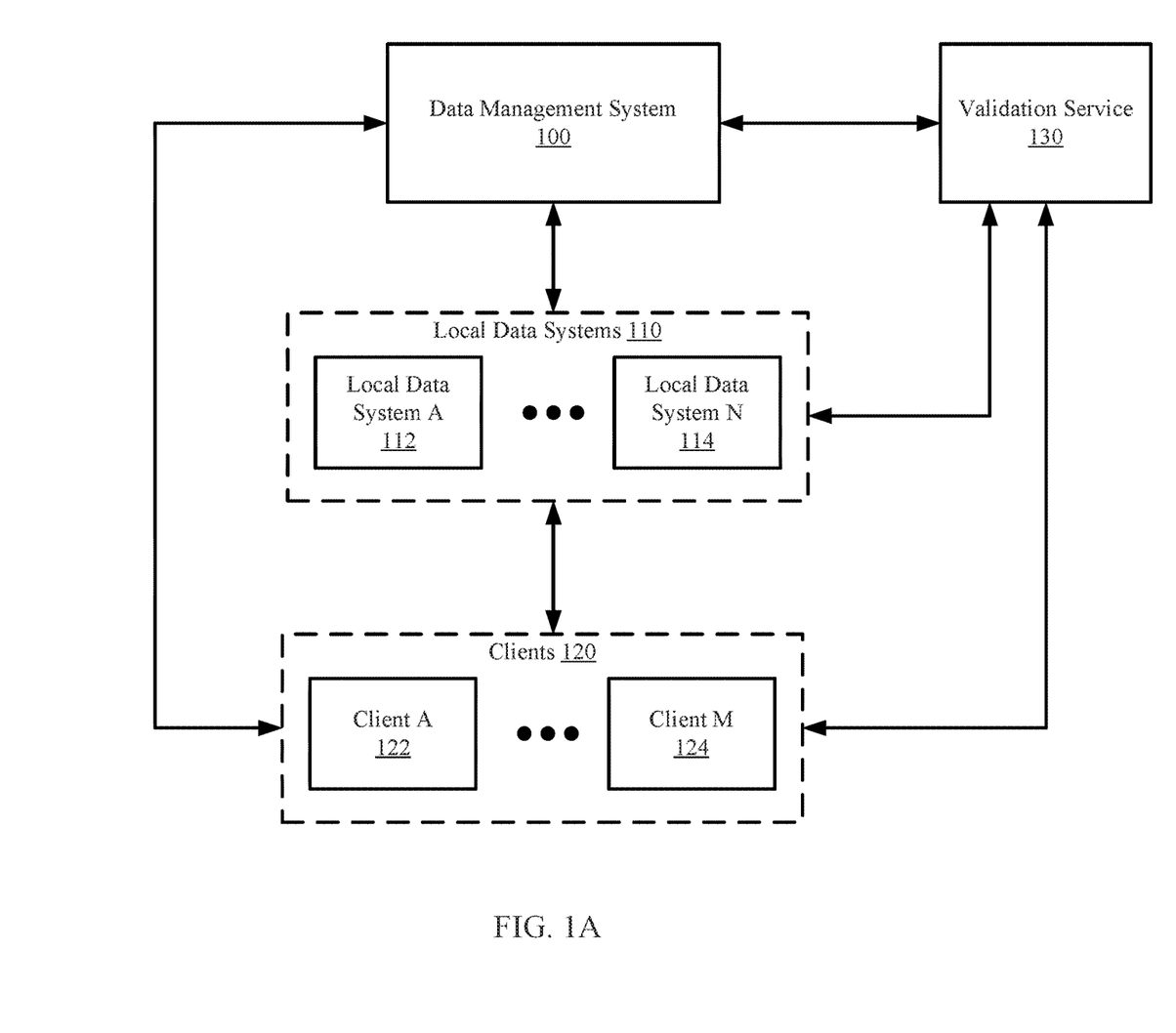
FIG. 1A shows a diagram of a system in accordance with one or more embodiments of the invention.

FIG. 1A shows a diagram of a system in accordance with one or more embodiments of the invention. The system includes a data management system (100), local data systems (110), clients (120), and a validation service. Each component of the system may be operably connected via any combination of wired and/or wireless connections. Each component of the system illustrated in FIG. 1A is discussed below.

In one or more embodiments of the invention, the data management system (100) is a device that manages data. The data may be provided by a local data system (112, 114). The data management system may manage the data by obtaining data sets from the local data systems (110) and generating derived data in accordance with applications and/or algorithms specified by the clients (120).

Figure 4:
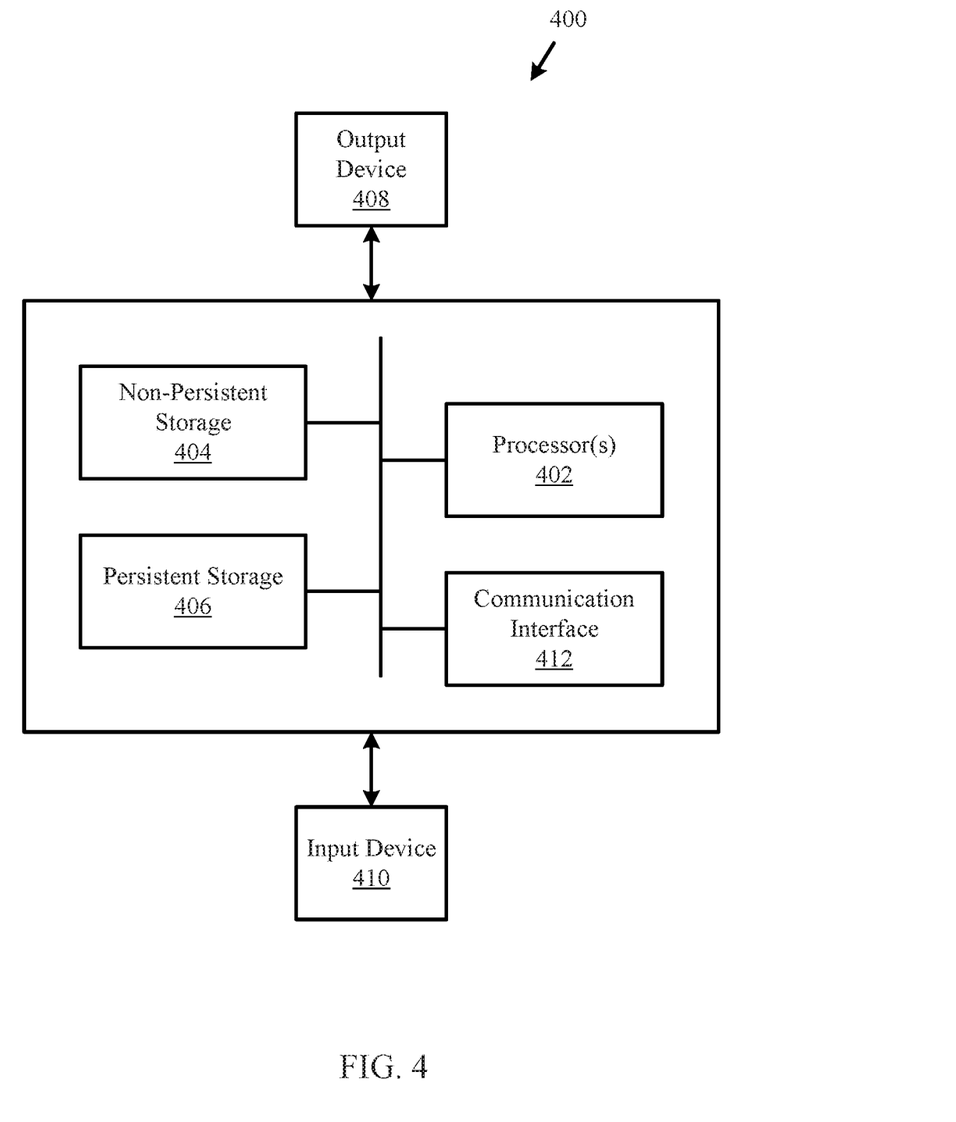
FIG. 4 shows a diagram of a computing device in accordance with one or more embodiments of the invention.

In one or more embodiments of the invention, the data management system (100) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the data management system (100) described in this application and/or all, or portion, of the methods illustrated in FIG. 2.

The data management system (100) may be implemented as a logical device without departing from the invention. The logical device utilizes computing resources of any number of physical computing devices to provide the functionality of the data management system (100) described throughout this application and/or all, or portion, of the methods illustrated in FIG. 2. For additional details regarding the data management system, see, e.g., FIG. 1C.

In one or more embodiments of the invention, the local data systems (110) are systems that obtain data, store data, provide data, and/or execute applications based on the stored data. The local data systems (110) may provide the stored data and/or applications to the clients (120) as specified by terms agreed to by the clients (120) based on transactions between the clients (120) and the local data systems (110).

In one or more embodiments of the invention, each local data system (110) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the local data system (110) described throughout this application.

A local data system (112, 114) may be implemented as a logical device without departing from the invention. The logical device utilizes computing resources of any number of physical computing devices to provide the functionality of the local data system (112, 114) described throughout this application and/or all, or portion, of the method illustrated in FIG. 2B. For additional details regarding a local data system (112, 114), see, e.g., FIG. 1B.

In one or more embodiments of the invention, the clients (120) may utilize computing resources and/or access data of the local data systems (110) based on terms established between the clients (120) and the local data systems (110). The clients (120) may communicate with the data management system (100) to obtain derived data based on data obtained from the local data systems (110).

In one or more embodiments of the invention, the clients (120) provide applications and/or algorithms to the data management system to be applied to the obtained data. The applications and/or algorithms may be executed by one or more computing devices of the data management system (100).

In one or more embodiments of the invention, each client (122, 124) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the client (122, 124) described throughout this application.

A client (122, 124) may be implemented as a logical device without departing from the invention. The logical device utilizes computing resources of any number of physical computing devices to provide the functionality of the client (122, 124) described throughout this application.

In one or more embodiments of the invention, a validation service (130) is a service that tracks each instance of generated derived data by the data management system (100). Each instance may be tracked using a validation entry stored in the validation service (130). The validation entries may be accessed by the data management system (100), the clients (120), and/or the local data systems (110).

In one or more embodiments of the invention, a validation entry stored in the validation service (130) is a data structure that includes a client identifier, a derived data identifier, and a metadata identifier. The client identifier may be a string of numbers, letters, symbols, or any combination thereof that uniquely identifies the client (or other entity) that prompted the generation of the derived data specified by the derived data identifier. The derived data identifier may be a string of numbers, letters, symbols, or any combination thereof that uniquely identifies the derived data. The derived metadata identifier may be a string of numbers, letters, symbols, or any combination thereof that uniquely identifies the derived metadata associated with the derived data.

The validation entry may further specify the entity (e.g., a client (122, 124)) that prompted the generation of the derived data and a timestamp that specifies when the derived data and derived metadata were generated.

In one or more embodiments of the invention, the validation service (130) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the validation service (130) described throughout this application.

In one or more embodiments of the invention, the validation service (130) is implemented as a logical device. The logical device may utilize computing resources of any number of physical computing devices to provide the functionality of the validation service (130) described throughout this application.

Figure 1B:
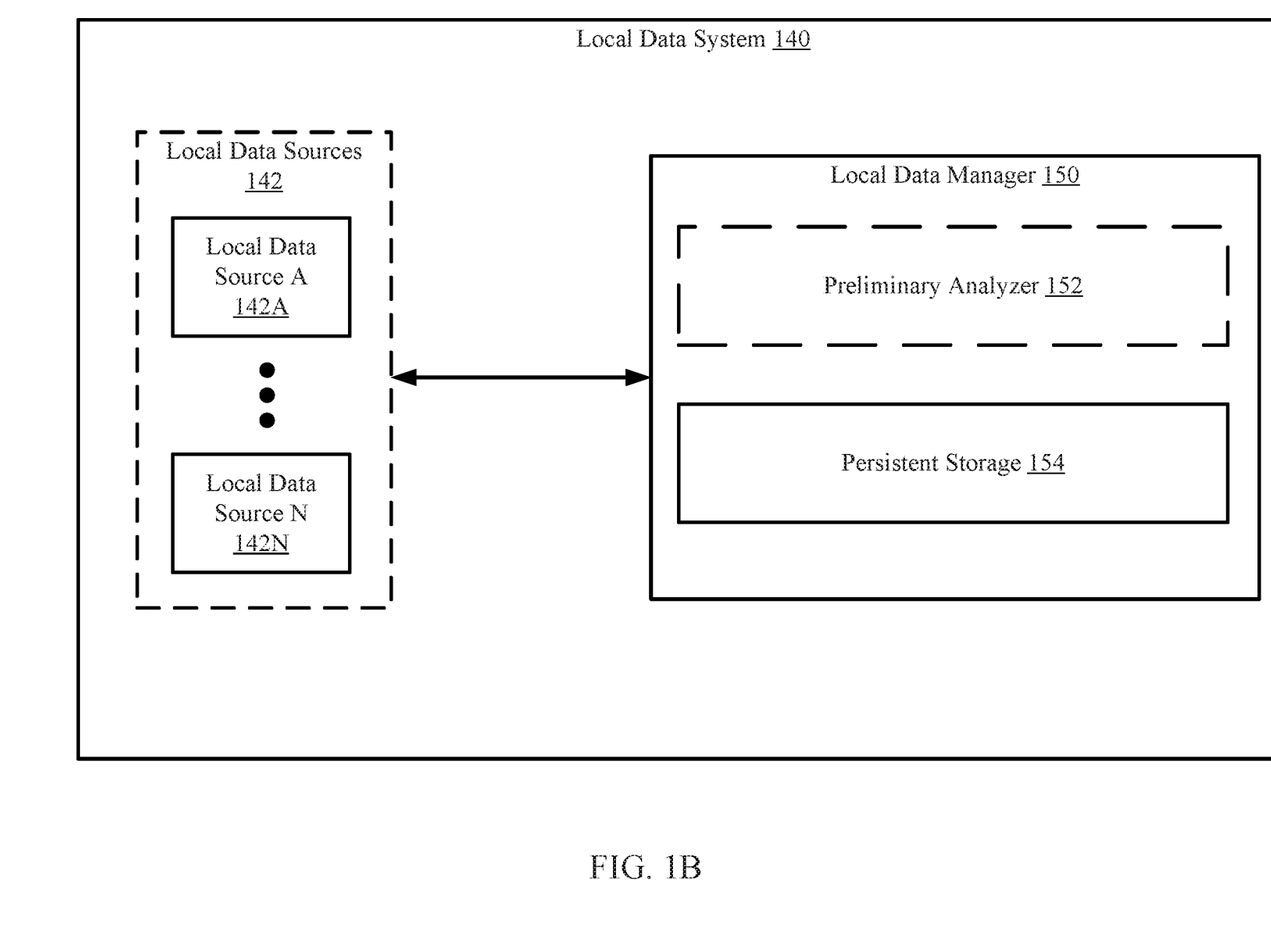
FIG. 1B shows a diagram of a local data system in accordance with one or more embodiments of the invention.

FIG. 1B shows a diagram of a local data system in accordance with one or more embodiments of the invention. The local data system (140) may be similar to a local data system (112, 114) discussed above. As discussed above, the local data system (140) may obtain data, store data, and provide data to a client and/or to a data management system. To perform the aforementioned functionality, the local data system (140) includes local data sources (142) and a local data manager (150). The local data sources (142) and the local data manager (150) may be operably connected via any combination of wired and/or wireless networks without departing from the invention. The local data system (140) may include additional, fewer, and/or different components without departing from the invention. Each of the aforementioned components is discussed below.

In one or more embodiments of the invention, the local data sources (142) are sources of data obtained from real-world processes. A data source may be, for example, a sensor. The sensor may be a hardware device for supplying data regarding a real-world process. For example, the sensor may be a count sensor that determines the number of items that are present in a particular location. The count sensor may supply the number of items to a database that stores the information on behalf of the count sensor. The sensor may be other types of sensors (e.g., distance sensors, temperature sensors, cameras, audio sensors, etc.) without departing from the invention.

In one or more embodiments of the invention, at least one of the local data sources (142A, 142N) is an Internet of things (IOT) device. For example, one of the data sources (142A) may be a camera operably connected to the Internet and that supplies data via an IOT standard to the local data manager (150). The data may be a video stream of a particular location. Image recognition may be utilized to extract relevant information from the video stream. The relevant information may be supplied to the local data manager (150) in isolation or in combination with the video stream itself.

In one or more embodiments of the invention, the local data manager (150) is a device (e.g., a computing device as shown in FIG. 4) that manages data obtained from the local data sources (142). The local data manager (150) may manage the data by storing the data in persistent storage (154) and/or providing the data to external entities (e.g., a data management system). The local data manager (150) may include a preliminary analyzer (152) and persistent storage (154). The local data manager may include additional, fewer, and/or different components without departing from the invention.

In one or more embodiments of the invention, the preliminary analyzer (152) is a device that performs a preliminary analysis on obtained data prior to sending the data to other entities. The preliminary analysis may include identifying metadata associated with a data set and determining, based on the metadata, whether the data may be sent to another entity (i.e., a data management system). The metadata may include, for example, licensing information that specifies who has access to the data set. The preliminary analyzer may be configured by a user (or other entity) that has access to configure the local data manager (150) and/or components of the local data manager (150).

In one or more embodiments of the invention, the preliminary analysis includes performing a preliminary derivation on the obtained data to generate a portion of derived data. The derived data may be sent to the entities requesting to obtain the portion of derived data and combined with other obtained portions of derived data (e.g., from other local data systems) to generate derived data.

In one or more embodiments of the invention, the preliminary analysis further determines whether the obtained data from the local data sources (142) may be used to generate derived data (e.g., whether the data may be combined with other data sets). The determination may be performed by identifying the metadata associated with the local data sets and determining whether the metadata specifies any limitations to the obtained data that may prohibit the obtained data from being used to generate derived data. For example, metadata associated with an obtained data set may specify that the obtained data may not be combined with other data sets. The preliminary analyzer (152), in response to this determination, may not send the obtained data set to a data management system to be used to perform a derived data operation.

In one or more embodiments of the invention, the local data manager (150) does not include a preliminary analyzer (152). A local data manager (150) that does not include the preliminary analyzer (152) may include functionality for storing data obtained from the local data sources (142) and communicating with a data management system to send the obtained data.

In one or more embodiments of the invention, the persistent storage (154) stores data obtained from the local data sources (142). The data stored in the persistent storage (154) may be provided to clients, a data management system, and/or other external entities without departing from the invention.

Figure 1C:
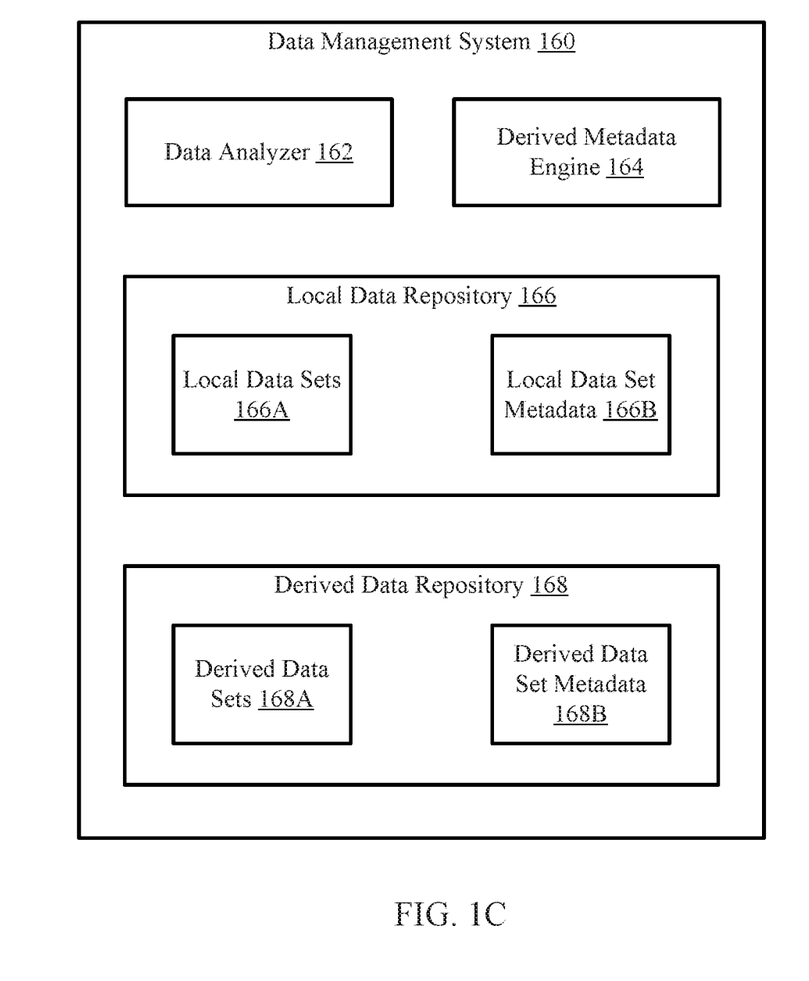
FIG. 1C shows a diagram of a data management system in accordance with one or more embodiments of the invention.

FIG. 1C shows a diagram of a data management system in accordance with one or more embodiments of the invention. The data management system (160) may be similar to the data management system (100, FIG. 1A) discussed above. The data management system (160) may include a data analyzer (162), a derived metadata engine (164), a local data repository (166), and a derived data repository (168). The data management system (160) may include additional, fewer, and/or different components without departing from the invention. Each component of the data management system (160) illustrated in FIG. 1C is discussed below.

In one or more embodiments of the invention, the data analyzer is a device that performs derived data operations on obtained data to generate derived data sets (168A). The obtained data may be local data sets (166A) stored in the local data repository (166). The derived data operations performed by the data analyzer (162) may be, for example, an algorithm, application, and/or other analysis specified by a client.

For example, the derived data operations may be a machine learning algorithm. The obtained data may be training data that may be used to generate a training model. The training model may be stored in the derived data repository (168) as derived data sets (168A).

In one or more embodiments of the invention, the data analyzer (162) is a hardware device including circuitry. The data analyzer (162) may be, for example, a digital signal processor, a field programmable gate array, or an application specific integrated circuit. The data analyzer (162) may be other types of hardware devices without departing from the invention.

In one or more embodiments of the invention, the data analyzer (162) is implemented as computing code stored on a persistent storage that when executed by a processor (e.g., a processor of the data management system) performs the functionality of the data analyzer (162). The processor may be a hardware processor including circuitry such as, for example, a central processing unit or a microcontroller. The processor may be other types of hardware devices for processing digital information without departing from the invention.

In one or more embodiments of the invention, the derived metadata engine (164) is a device that performs derived metadata operations on local data set metadata (166B) stored in the local data repository. The derived metadata operations performed by the derived metadata engine may include, for example, implementing a set of rules that specify how to combine portions of the metadata. The set of rules may specify, for example, how to handle any conflicts that arise from two or more sets of local data set metadata.

In one or more embodiments of the invention, the derived metadata engine (164) is a hardware device including circuitry. The derived metadata engine (164) may be, for example, a digital signal processor, a field programmable gate array, or an application specific integrated circuit. The derived metadata engine (164) may be other types of hardware devices without departing from the invention.

In one or more embodiments of the invention, the derived metadata engine (164) is implemented as computing code stored on a persistent storage that when executed by a processor (e.g., a processor of the data management system) performs the functionality of the derived metadata engine (164). The processor may be a hardware processor including circuitry such as, for example, a central processing unit or a microcontroller. The processor may be other types of hardware devices for processing digital information without departing from the invention.

In one or more embodiments of the invention, the local data repository (166) is a data structure that includes one or more local data sets (166A). The local data sets (166A) may be raw data obtained from one or more local data systems (e.g., 112, 114, FIG. 1A). The local data sets (166A) may be used by the data analyzer (162) to generate derived data sets (168A).

In one or more embodiments of the invention, the local data repository further includes local data set metadata (166B). The local data set metadata (166B) are data structures that are each associated with a local data set stored in the local data set repository (166). The local data set metadata may specify information about its respective local data set. The information may specify, for example, an owner of the data set, any security information associated with the data set, any licensing information associated with the data set (e.g., any license agreements established for how to access the data), any data protection information, and/or other information without departing from the invention.

In one or more embodiments of the invention, an owner of a local data set is specified by an identifier that is associated with a user, or another legal entity, that has ownership of the local data set. In one or more embodiments of the invention, a legal entity is a person, a group of people, a partnership, corporation, any other business entity, or any combination thereof. The identifier may be, for example, a string of numbers, letters, symbols, or any combination thereof that uniquely identifies the owner.

The owner of the local data set may provide security measures to protect the local data set and prevent the identifier from being mishandled (i.e., altered) without the owner's permission. In one or more embodiments of the invention, the security information of a data set specifies the security measures (if any) specified by the user (or other legal entity). For example, the local data set may be protected by being encrypted, by being associated with a digital signature, by being stored in an immutable fashion (e.g., in a way that it cannot be altered or modified), and/or any other security measurements implemented on the local data sets without departing from the invention.

In one or more embodiments of the invention, licensing information specifies whether the local data set has been licensed to a data purchaser (i.e., a legal entity that has been granted access to the local data set). The licensing information may include terms accepted by the data purchaser, an identifier of the data purchaser, and/or any other information related to a licensing agreement of the local data set.

Specifically, in one or more embodiments of the invention, the terms of the licensing information of a local data set specify an owner of the local data set, a data purchaser (i.e., an entity that is allowed to use the data), a list of terms for how the data may be used (e.g., whether the local data set may be used with other local data sets to derive data), and/or any exclusive rights that an owner of the local data set may have with regard to any data derived using the local data set. If a local data set has exclusive rights to derived data, a local data set metadata of the local data set may specify that for any derived data that is generated using the local data set, the owner of the local data set will be the only owner of the derived data.

In one or more embodiments of the invention, the data protection information of a local data set specifies any backup policies implemented for backing up and/or restoring the local data set. The data protection information may further include whether a copy of the local data set exists, where the copy is stored (if it exists), and information for accessing the copy (if it exists).

In one or more embodiments of the invention, the derived data repository (168) is a data structure that includes derived data (166A). The derived data may be a data structure that is generated by the data analyzer (162) by implementing a client-defined algorithm, or other application, to one or more local data sets (166A).

In one or more embodiments of the invention, the local data set metadata (166B) of a local data set specifies restrictions that the local data set may have with respect to how the local data set is used. For example, a restriction of a local data set specifies not allowing the local data set to be used to derive data. As another example, a restriction may specify not allowing the local data set to be used with any local data set owned by a specified owner(s). Other restrictions may be specified in the local data set metadata (166B) without departing from the invention.

In one or more embodiments of the invention, the derived data repository (168) further includes derived data set metadata (168B). The derived data set metadata (168B) may be generated by the derived metadata engine (164). The derived data set metadata (168B) may include, for example, an owner of the derived data set (168A), any security information associated with the derived data set (168A), any licensing information associated with the derived data set, any data protection information about the derived data set, and/or other information without departing from the invention.

Figure 2:
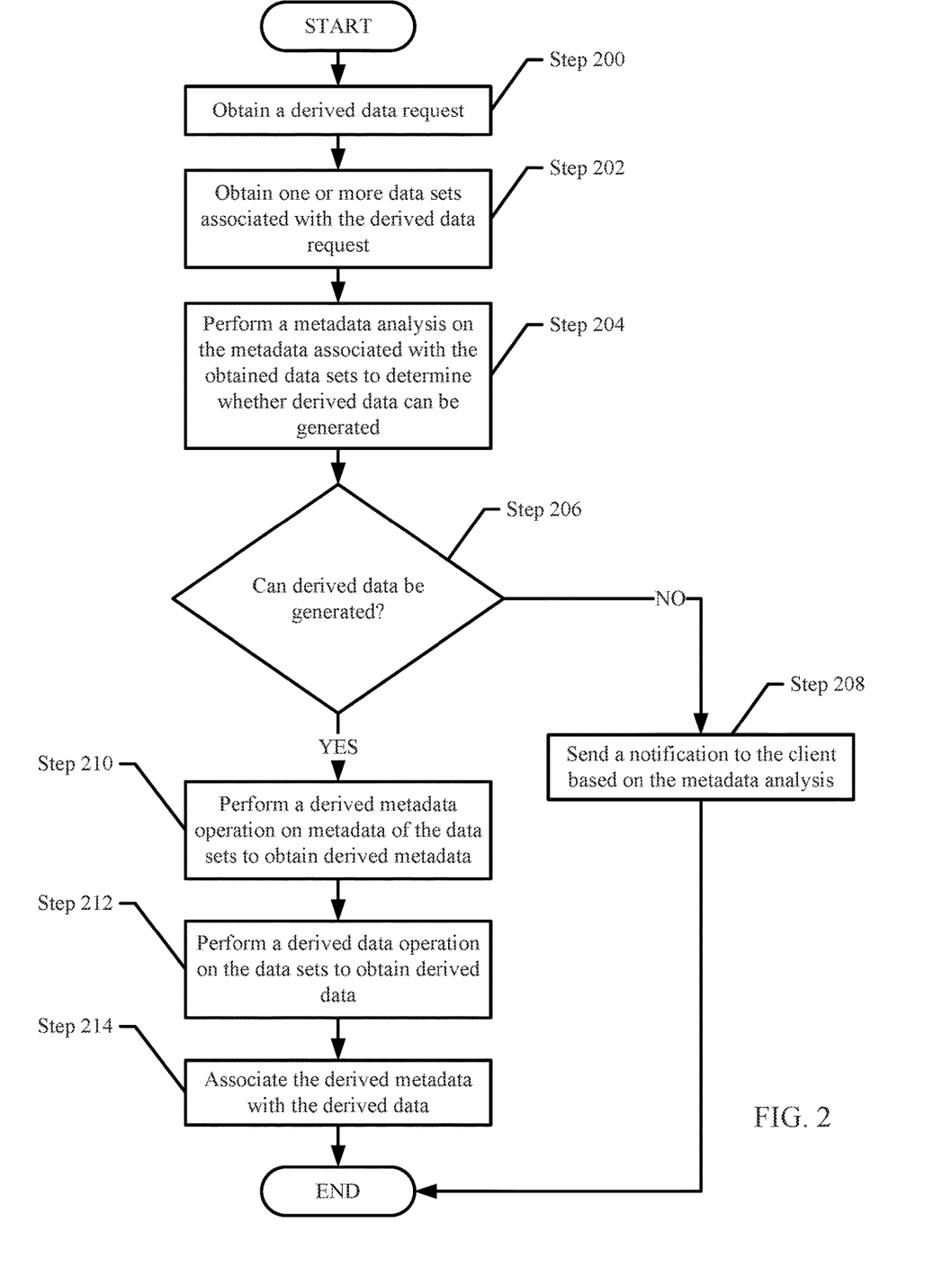
FIG. 2 shows a flowchart for managing data use operations in accordance with one or more embodiments of the invention.

FIG. 2 shows a flowchart in accordance with one or more embodiments of the invention. While the various steps in the flowchart are presented and described sequentially, one of ordinary skill in the relevant art will appreciate that some or all of the steps may be executed in different orders, may be combined or omitted, and some or all steps may be executed in parallel. In one embodiment of the invention, the steps shown in FIG. 2 may be performed in parallel with any other steps shown in FIG. 2 without departing from the scope of the invention.

FIG. 2 shows a flowchart for managing data use operations in accordance with one or more embodiments of the invention. The method shown in FIG. 2 may be performed by, for example, a data management system (100, FIG. 1A). Other components of the system illustrated in FIG. 1A may perform the method of FIG. 2 without departing from the invention.

Turning to FIG. 2, in step 200, a derived data request is obtained. In one or more embodiments of the invention, the derived data request is obtained from a client that requests to execute an algorithm, or other application on data from one or more data sets. The derived data request may specify the data, the local data systems that store the data, the algorithm/application, and/or other information without departing from the invention.

In step 202, one or more data sets associated with the derived data request are obtained. In one or more embodiments of the invention, each obtained data set is obtained from a local data system. The data sets may include the local data sets and local data set metadata associated with each local data set. The data management system may obtain the data sets by sending local data requests to the local data systems storing the data sets that specify the local data sets and local data set metadata and receiving a response from the local data systems that include the data sets.

Alternatively, the data sets are obtained from a local data repository of the data management system. In one or more embodiments of the invention, the data management system determines whether the data specified in the derived data request is stored in the local data repository. If the data is stored in the local data repository, the data management system may determine whether the data is the most recent data from the local data system. If the data is the most recent, the data is obtained from the local data repository.

In step 204, a metadata analysis is performed on metadata associated with the obtained data sets to determine whether derived data can be generated. In one or more embodiments of the invention, the metadata analysis is performed by identifying the metadata, identifying any restrictions associated with a local data set based on the metadata (e.g., an obtained data set may not be combined or otherwise modified using other data sets), and determining whether the restrictions prevent the obtained data set from being used to generate derived data.

For example, an obtained local data set A with an owner A may have exclusive rights to derived data generated using the local data set A. A second obtained local data set B with an owner B may have exclusive rights to derived data generated using the local data set B. The data management system performing the metadata analysis may identify the exclusive rights to each obtained local data set and deteimine that derived metadata may not be generated that satisfies both exclusive rights. In other words, it may determine that derived data generated using both local data set A and local data set B may not be owned exclusively by owner A and exclusively owned by owner B. In this manner, the metadata analysis may result in the data management system determining that derived data cannot be generated.

In step 206, a determination is made about whether the derived data can be generated. If the derived data can be generated, the method proceeds to step 210; otherwise, the method proceeds to step 208.

In step 208, a notification is sent to the client based on the metadata analysis. The notification may be, for example, an email, a text message (SMS or otherwise), and/or any other message without departing from the invention.

In one or more embodiments of the invention, the notification specifies the reasons for which the data management system determined that the derived data cannot be generated. For example, if the derived data cannot be generated due to conflicts with exclusive rights as discussed above, the notification may specify the local data set(s) that are associated with exclusive rights and what those exclusive rights are.

In step 210, a derived metadata operation is performed on metadata of the data sets to obtain derived metadata. In one or more embodiments of the invention, the derived metadata operation includes identifying conflicts between metadata of each local data set and applying a predefined rules set to the metadata to resolve any conflicts that arise.

In one or more embodiments of the invention, the derived metadata operation includes combining characteristics of the metadata in a way that is compatible. For example, the metadata of a first obtained local data set may include first metadata that specifies a first owner of the first local data set. A second obtained local data set may include second metadata that specifies a second owner of the second local data set. A derived metadata operation performed on the first and second metadata may include generating a derived metadata that specifies both the first and second owners as partial owners of derived data associated with the first and second local data sets.

In one or more embodiments of the invention, the derived metadata operation is performed using a rules set, programmed by an administrator that manages the data management system, which specifies how to combine the local data set metadata of the local data sets. For example, for the derived metadata that specifies the first and second owners as partial owners, the rules set may specify how to divide the ownership of the derived data. The rules set engine may specify, for example, that the ownership is to be divided evenly between the two owners. Alternatively, the rules set may specify that the ownership be divided based on the size of the respective local data set used to generate the derived data. In other words, if the derived data comprises a larger portion of the first local data set than the second local data set, the first owner may have a larger ownership than the second owner. The rules set may specify other conditions for combining the characteristics of the metadata without departing from the invention.

In step 212, a derived data operation is performed on the obtained data sets to obtain derived data. In one or more embodiments of the invention, the derived data operation includes performing a specified algorithm, or other application, on the derived data. The algorithm, or other application, may be specified in the derived data request.

In step 214, the derived metadata is associated with the derived data. In one or more embodiments of the invention, the derived metadata is associated with the derived data by embedding the derived metadata into the derived data. For example, the derived metadata engine of the data management system may provide the derived metadata to the data analyzer to allow the data analyzer to store the derived data as a portion of the derived data.

In one or more embodiments of the invention, the derived metadata is associated with the derived data by including a reference to the derived metadata that is associated with the derived data. The reference may be, for example, a pointer, a hash value, a derived data identifier, and/or any other reference without departing from the invention.

In one or more embodiments of the invention, the derived data and derived metadata is provided to the client. The data management system may send the derived data and derived metadata to the client. Alternatively, the data management system may store the derived data and derived metadata in a persistent storage of the data management system and provide access information (e.g., a hyperlink that connects to a web server hosting the derived metadata) to the client that specifies how to access the data.

In one or more embodiments of the invention, after the derived data and the derived data set is provided to the client, a validation entry is generated and stored in a validation service. The validation entry may be accessed by the client, by the data management system, and/or by any other entity to determine when, how, and by whom the derived data and derived metadata was generated. The validation entry may be used to determine other information without departing from the invention.

EXAMPLE

Figure 3A:
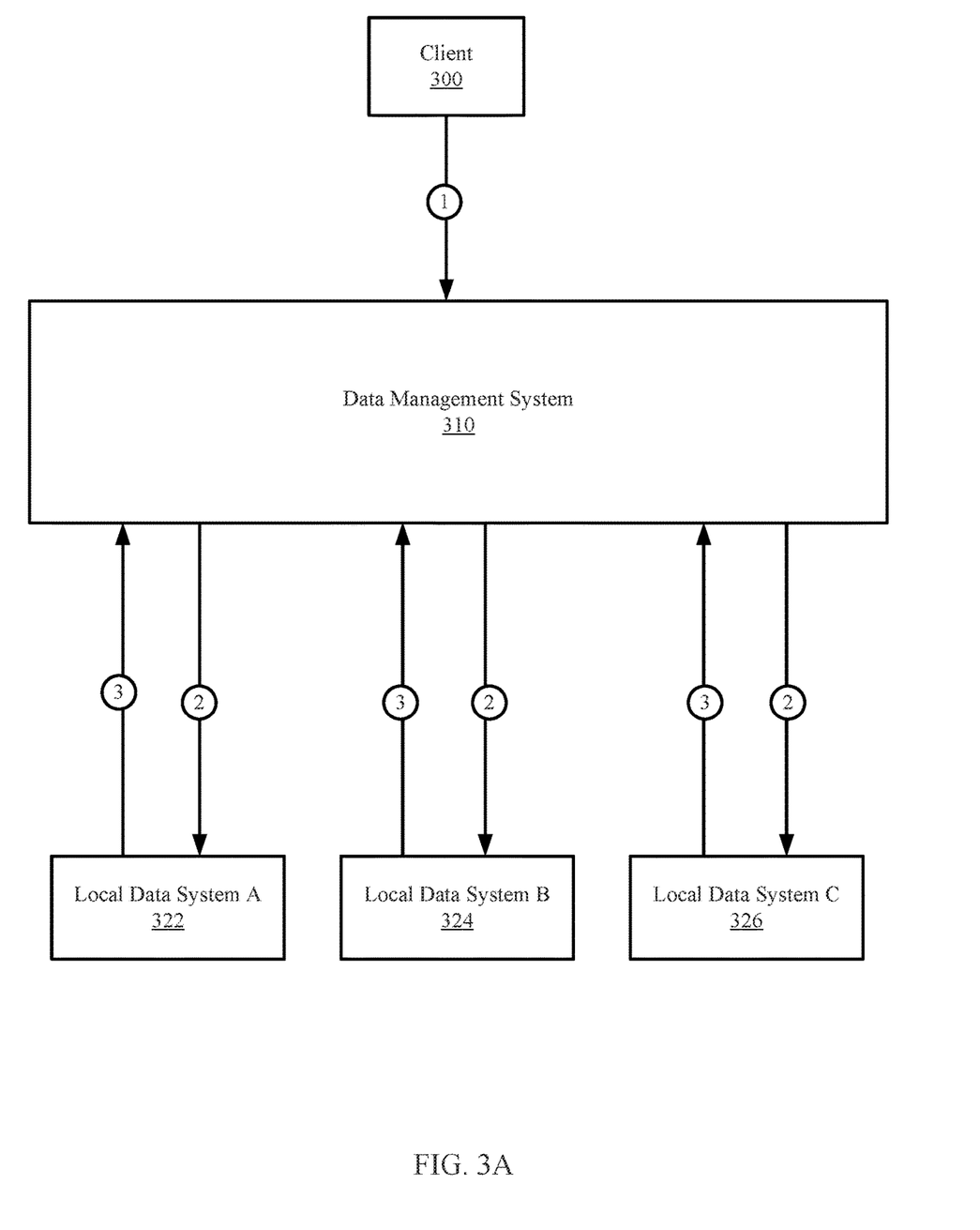
FIGS. 3A-3B show an example in accordance with one or more embodiments of the invention.
Figure 3B:
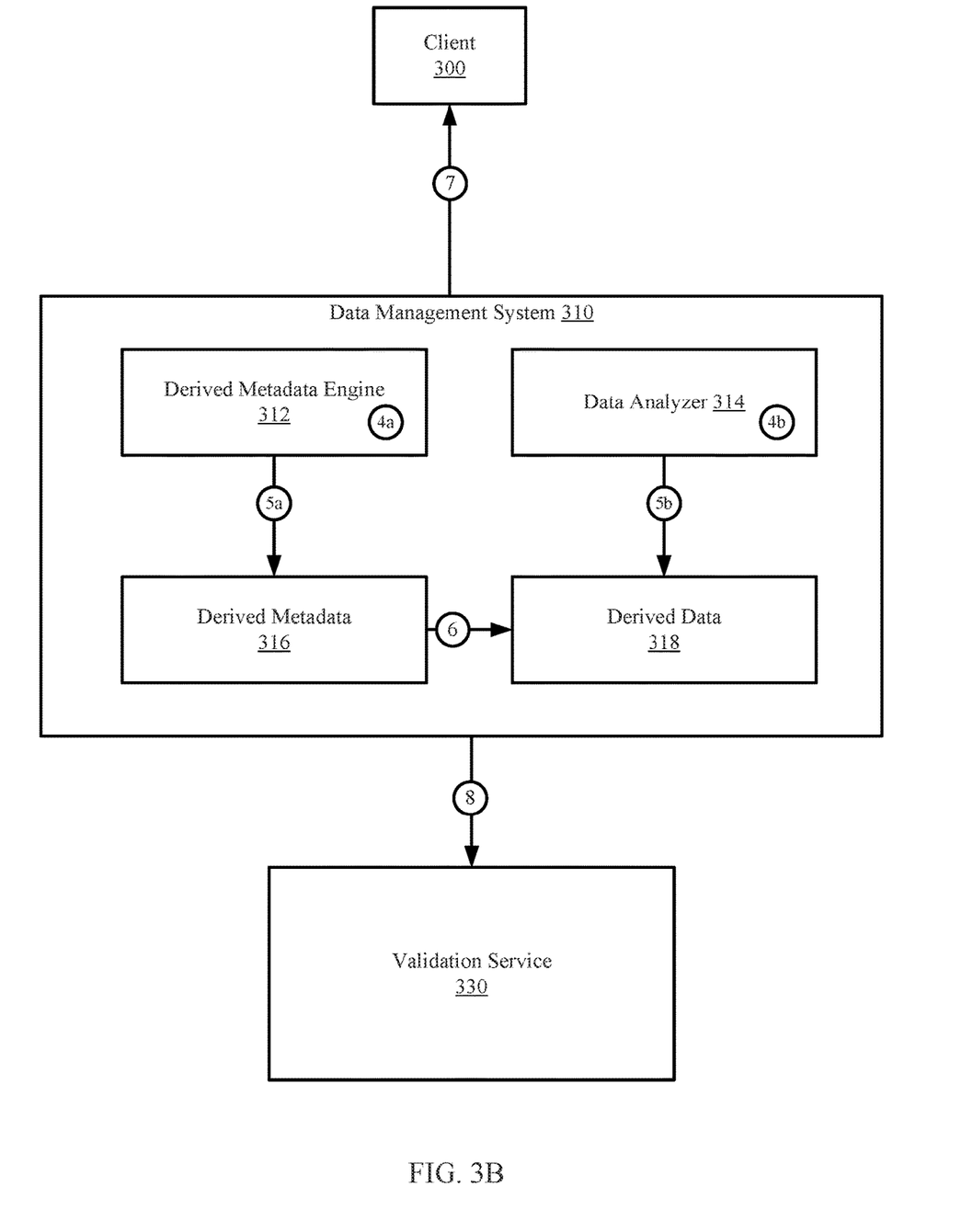

The following section describes an example. The example, illustrated in FIGS. 3A-3B, is not intended to limit the invention. Turning to the example, consider a scenario in which a client requests to utilize computing resources of a data management system to derive data using temperature data from one or more local data systems. FIG. 3A shows a diagram of an example system. The example system includes a client (300) sending a derived data request to a data management system (310) [1]. The derived data request may specify generating derived data. The derived data may be generated by combining temperature readings obtained from multiple local data systems (322, 324, 326) located in different geographical locations to be used to compare temperatures between the geographical locations.

The data management system (310), based on the derived data request, may send local data requests to the local data systems (322, 324, 326) to obtain local data sets associated with the derived data request [2]. The local data systems (322, 324, 326) may each send the local data sets to the data management system (310). The local data systems may further send metadata associated with the local data sets [3].

The metadata may include licensing information that specifies allowing the client (300) to use the local data sets to derive other data. The licensing information may further specify the owner of the local data sets (which may be an entity separate from the client (300)) as the owner of any derived data generated by using the local data sets. Each local data set obtained from a local data system (322, 324, 326) may be associated with a different owner.

FIG. 3B shows a diagram of the example system. The data management system (310) includes a derived metadata engine (312) that perfoims a derived metadata operation on the obtained metadata associated with the obtained local data sets [4a]. The derived metadata operation includes identifying licensing information of the local data sets used to generate the derived data and combining the licensing information based on a rules set. The derived metadata engine (312) may identify the owners of the local data sets and specify each owner as an equal partial owner of the derived data sets. The derived metadata engine, as a result of the derived metadata operation, generates derived metadata (316) [5a] that specifies each partial owner using an owner identifier and a percentage of ownership of the derived data (318).

While the derived metadata operation is performed, a data analyzer (314) of the data management system (310) perfoims a derived data operation [4b]. The derived data operation may include combining the obtained local data sets to generate a new data set that specifies the temperature readings of multiple geographical locations. The new data set may be stored as derived data (318) [5b].

After the derived data (318) and the derived metadata (316) are generated, the derived metadata (316) is associated with the derived data (318) by embedding the derived metadata (316) into the derived data (318) [6]. In this manner, the derived data (318) may be sent to the client (300) with the derived metadata (316) [7].

After the derived data (318) and derived metadata (316) is provided to the client, a validation entry is generated into a validation service (330) [8]. The validation entry may be used to keep record of what data was used to generate the derived data (318) and/or any metadata associated with the derived data (318). The validation entry may specify the derived data, the derived metadata, a timestamp in which the End of Example As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the reliability of generating derived data obtained using data from real-world processes (e.g., via sensors). The reliability is improved by deriving metadata associated with the derived data.

In a traditional implementation, a virtualized computing system that derives data may not have an automated method for deriving corresponding metadata. The derived metadata may specify characteristics about the derived data that may be important for another entity to have when licensing the derived data, protecting the derived data, determining a trustworthiness of the derived data, or otherwise using the derived data. Embodiments of the invention, by generating the derived metadata and associating the derived metadata to the derived data, improve the usefulness of the derived data.

Thus, embodiments of the invention may address the problem of inefficient use of computing resources. This problem arises due to the technological nature of the environment in which data is managed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
obtaining, by a data management system, a derived data request from a client; and
in response to the derived data request:
obtaining a plurality of data sets based on the derived data request;
identifying a plurality of metadata, wherein each metadata of the plurality of metadata is associated with a data set of the plurality of data sets;
performing a metadata analysis on the plurality of metadata;
making a determination, based on the metadata analysis, that derived data may be generated;
performing a derived metadata operation on the plurality of metadata to obtain derived metadata;
performing a derived data operation on the data sets to obtain derived data;
associating the derived metadata with the derived data;
providing the derived metadata and the derived data to the client obtaining, by the data management system, a second derived data request from a client;
in response to the second derived data request:
obtaining a second plurality of data sets;
identifying a second plurality of metadata, wherein each metadata of the second plurality of metadata is associated with a data set of the second plurality of data sets;
performing a second metadata analysis on the second plurality of metadata;
making a second determination, based on the second metadata analysis, that derived data may not be generated; and
sending, based on the second determination, a notification to the client based on the second determination.

2. The method of claim 1, wherein each data set of the plurality of data sets is obtained from a local data system.

3. The method of claim 1, wherein a metadata of the plurality of metadata specifies at least one of an owner of the data, security information, licensing information, and data protection information.

4. The method of claim 1, wherein the derived data operation comprises:
identifying conflicts between each metadata of the plurality of metadata;
applying a rules set to the plurality of metadata to resolve the conflicts; and
generating a derived metadata based on the applying.

5. The method of claim 1, wherein the derived data operation is performed by a data analyzer executing on the data management system.

6. The method of claim 1, wherein the derived metadata operation is performed by a derived metadata engine executing on the data management system.

7. A non-transitory computer readable medium comprising computer readable program code, which when executed by a computer processor enables the computer processor to perform a method, the method comprising:
obtaining, by a data management system, a derived data request from a client; and
in response to the derived data request:
obtaining a plurality of data sets based on the derived data request;
identifying a plurality of metadata, wherein each metadata of the plurality of metadata is associated with a data set of the plurality of data sets;
performing a metadata analysis on the plurality of metadata;
making a determination, based on the metadata analysis, that derived data may be generated;
performing a derived metadata operation on the plurality of metadata to obtain derived metadata;
performing a derived data operation on the data sets to obtain derived data;
associating the derived metadata with the derived data;
providing the derived metadata and the derived data to the client obtaining, by the data management system, a second derived data request from a client;
in response to the second derived data request:
obtaining a second plurality of data sets;
identifying a second plurality of metadata, wherein each metadata of the second plurality of metadata is associated with a data set of the second plurality of data sets;
performing a second metadata analysis on the second plurality of metadata;
making a second determination, based on the second metadata analysis, that derived data may not be generated; and
sending, based on the second determination, a notification to the client based on the second determination.

8. The non-transitory computer readable medium of claim 7, wherein each data set of the plurality of data sets is obtained from a local data system.

9. The non-transitory computer readable medium of claim 7, wherein a metadata of the plurality of metadata specifies at least one of an owner of the data, security information, licensing information, and data protection information.

10. The non-transitory computer readable medium of claim 7, wherein the derived data operation comprises:

identifying conflicts between each metadata of the plurality of metadata;
applying a rules set to the plurality of metadata to resolve the conflicts; and
generating a derived metadata based on the applying.

11. The non-transitory computer readable medium of claim 7, wherein the derived data operation is performed by a data analyzer executing on the data management system.

12. The non-transitory computer readable medium of claim 7, wherein the derived metadata operation is performed by a derived metadata engine executing on the data management system.

13. A system, comprising:
a processor; and
memory comprising instructions which, when executed by the processor, perform a method, the method comprising:
obtaining, by a data management system, a derived data request from a client; and
in response to the derived data request:
obtaining a plurality of data sets based on the derived data request;
identifying a plurality of metadata, wherein each metadata of the plurality of metadata is associated with a data set of the plurality of data sets;
performing a metadata analysis on the plurality of metadata;
making a determination, based on the metadata analysis, that derived data may be generated;
performing a derived metadata operation on the plurality of metadata to obtain derived metadata;
performing a derived data operation on the data sets to obtain derived data;
associating the derived metadata with the derived data;
providing the derived metadata and the derived data to the client obtaining, by the data management system, a second derived data request from a client;
in response to the second derived data request:
obtaining a second plurality of data sets;
identifying a second plurality of metadata, wherein each metadata of the second plurality of metadata is associated with a data set of the second plurality of data sets;
performing a second metadata analysis on the second plurality of metadata;
making a second determination, based on the second metadata analysis, that derived data may not be generated; and
sending, based on the second determination, a notification to the client based on the second determination.

14. The system of claim 13, wherein each data set of the plurality of data sets is obtained from a local data system.

15. The system of claim 13, wherein a metadata of the plurality of metadata specifies at least one of an owner of the data, security information, licensing information, and data protection information.

16. The system of claim 13, wherein the derived data operation comprises:
identifying conflicts between each metadata of the plurality of metadata;
applying a rules set to the plurality of metadata to resolve the conflicts; and
generating a derived metadata based on the applying.

17. The system of claim 13,
wherein the derived data operation is performed by a data analyzer executing on the data management system, and
wherein the derived metadata operation is performed by a derived metadata engine executing on the data management system.

* * * * *